United States Patent [19]

Howelton et al.

[11] Patent Number: 5,342,918

[45] Date of Patent: Aug. 30, 1994

[54] CARBOXYL-TERMINATED POLYETHERAMINES

[75] Inventors: Richele T. Howelton; George P. Speranza, both of Austin, Tex.

[73] Assignee: Texaco Chemical Company, White Plains, N.Y.

[21] Appl. No.: 54,165

[22] Filed: Apr. 30, 1993

[51] Int. Cl.$^5$ .............................................. C08G 69/14
[52] U.S. Cl. ................................ 528/318; 528/312; 528/323; 528/324; 528/336; 528/339.3; 528/342; 528/347; 525/420; 525/432
[58] Field of Search ............... 528/324, 323, 312, 336, 528/342, 339.3, 347, 318; 525/420, 432

[56] References Cited

U.S. PATENT DOCUMENTS

| | | | |
|---|---|---|---|
| 3,454,534 | 7/1969 | Crovatt | 528/336 |
| 4,017,557 | 4/1977 | Hammer et al. | 525/66 |
| 4,024,116 | 5/1977 | Horn et al. | 528/324 |
| 4,356,300 | 10/1982 | Isler et al. | 528/324 |
| 4,581,440 | 4/1986 | Coquard et al. | 528/324 |
| 4,717,763 | 1/1988 | Coquard et al. | 528/324 |
| 4,919,997 | 4/1990 | Twilley et al. | 428/227 |
| 4,985,534 | 1/1991 | Heinz et al. | 528/324 |
| 5,213,891 | 5/1993 | Maj et al. | 528/324 |

OTHER PUBLICATIONS

T. G. Majury, "Amines and Carboxylic Acids as Initiators of Polymerization in Caprolactam," *Journal of Polymer Science*, vol. 31, 1958, pp. 383–397.

C. B. Chapman, et al., "The Preparation and Properties of Grafts of Polycaprolactam on Vinyl Copolymers," *Journal of Polymer Science*, vol. 34, 1959, pp. 319–335.

I. A. Tutorskii, et al. "Interaction of Carbox-yl-Containing Butadiene-Styrene Rubbers with Polyamides and ε-Caprolactam," *Journal of Polymer Science*, vol. 61, 1962, pp. 97–108.

R. A. Lofquist, et al., "Hydrophilic Nylon for Improved Apparel Comfort," *Textile Research Journal*, Jun. 1985, pp. 325–333.

*Primary Examiner*—John Kight, III
*Assistant Examiner*—P. Hampton-Hightower
*Attorney, Agent, or Firm*—Russell R. Stolle; David L. Mossman

[57] ABSTRACT

Described are carboxyl-terminated polyetheramides of the formula:

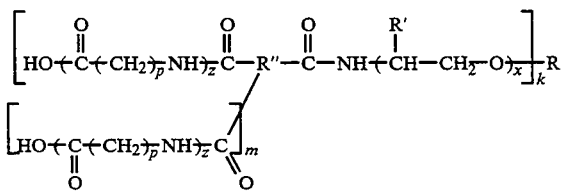

where R is a moiety from an alcohol or hydroxy compound having a valence of k; R' is independently hydrogen or lower alkyl from 1 to 4 carbon atoms; R" is independently a straight or branched alkylene or aromatic moiety averaging from about 2 to 36 carbon atoms; x averages from about 2 to 100; z averages from about 20 to about 250; k averages from about 1 to 3; m is 0 or 1; and p is independently 5 to 11. Because the carboxyl-terminated polyetheramides are all carboxyl-terminated, they do not gel. They are expected to have good impact strength as well as differing solubilities depending on the polyetheramine incorporated.

15 Claims, No Drawings

CARBOXYL-TERMINATED POLYETHERAMINES

FIELD OF THE INVENTION

The invention relates to carboxyl-terminated polyamides, and more particularly relates, in one aspect of the invention, to carboxyl-terminated polyamides having endblocks from cyclic lactams, midblocks which are amidoacids based on carboxylic acids and polyetheramines.

BACKGROUND OF THE INVENTION

It is well known that polyamides such as nylon-5, nylon-6, nylon-8, and nylon-12 have been produced by ring-opening polymerization of appropriate lactams. Nylon-6, also called polycaprolactam, was originated by I. G. Farbenindustrie in 1940. In one preparation technique, the polymerization of $\epsilon$-caprolactam (also known as $\epsilon$-aminocaprolactam or simply caprolactam), is carried out by adding water to open the ring and then removing water again at elevated temperature, where linear polymer forms. Caprolactam may also be polymerized by ionic chain mechanisms.

Nylon-6 has properties similar to nylon-66, but has a lower crystalline melting point and is somewhat softer and less stiff. The major use for the polymer is in tire cord. Polycaprolactam accounts for about 25% of U.S. consumption of nylon.

Methods are constantly being sought for the improvement of these polymers. For example, a few years after the invention of nylon 6,6 made from hexamethylene diamine and adipic acid, it was discovered that substitution of a portion of hexamethylene diamine with triethyleneglycol diamine gave polyamides with better dye receptivity and enhanced water absorption. An excellent example of how comfort and feel can be added to nylon 6 type polyamides has been described by R. A. Lofquist, et al., "Hydrophilic Nylon for Improved Apparel Comfort," Textile Research Journal, June 1985, p. 325–333. These authors copolymerized caprolactam with polyethyleneoxy diamines and dibasic acids such as terephthalic acid. Comfort-related tests revealed that fabrics made from such fibers are superior to those from polyesters and polyamides. See also U.S. Pat. No. 4,919,997 for a description of water-absorbing mats made using these techniques. The melt-blown water-absorbing mat of fibers of this patent comprise a block copolyether-amide having polyether and polyamide segments. The JEFFAMINE ® ED-Series amines were used as the amine-terminated polyethylene oxide glycols by Lofquist, et al. to produce a modified nylon-6. These amines are high molecular weight (600 to 2000) alkylene glycol diamines having the formula $H_2NRNH_2$, where the radical R is a polyoxyalkylene chain of molecular weight from about 200 to about 4000 having terminal carbon atoms to which nitrogen atoms are bonded. Moisture absorption was found to be greatest using the amines having the highest molecular weight.

U.S. Pat. No. 3,454,534 indicates that the hydrophilic characteristics of nylon-66 may be improved by adding a polyalkylene glycol diamine to the molten polymer prior to spinning. The process involves producing polyhexamethylene adipamide where equimolar proportions of adipic acid and hexamethylene diamine are reacted together to form molten polyhexamethylene adipamide. The improvement involved introducing from about 0.3 to 3.0 weight percent of a polyalkylene glycol diamine into the molten polymer subsequent to polymer formation and prior to spinning. The polyalkylene glycol diamine has the formula: $H_2N-(CH_2)_3-O-[R-O]_x-(CH_2)_3-NH_2$ where R is an alkylene hydrocarbon radical having a chain length of from 2 to about 8 carbon atoms, and x is an integer sufficiently large to confer a molecular weight of at least 1000. Note that propylene linkages are required and that the polyalkylene glycol diamine must have a molecular weight of at least 1000.

The U.S. Pat. No. 4,017,557 teaches 6-nylons and 12-nylons having primary amino end-groups and an average degree of polymerization of about 5–60 may be grafted onto elastomeric trunk polymers having anhydride groups, vicinal carboxylic groups, or carboxylic groups adjacent to alkoxycarbonyl groups by heating a mixture of the nylon and the trunk polymer, preferably under high shear conditions for about 1 minute or less to 30 minutes or more above the melting temperature of the nylon. The resulting elastomeric graft polymers are suitable for fabricating into a variety of articles, such as, for example, wire jacketing, hose, belts, seals, gaskets, and low pressure tires.

It is known to use monoamines and diamines to effect the polymerization of caprolactam. These amines do not contain ether groups and are taught as initiators and not as reactive modifiers. See, for example, T. G. Majury, "Amines and Carboxylic Acids as Initiators of Polymerization in Caprolactam," Journal of Polymer Science, Vol. 31, 1958, pp. 383–397, which concerns the polymerization of caprolactam with amines and carboxylic acids. The author concluded that acids induce more rapid polymerization than bases.

I. A. Tutorskii, et al. in "Interaction of Carboxyl-Containing Butadiene-Styrene Rubbers with Polyamides and $\epsilon$-Caprolactam," Journal of Polymer Science, Vol. 61, 1962, pp. 97–108, report grafting of caprolactam onto carboxylated butadiene-styrene rubbers by heating the rubber and the lactam in the presence of boron trifluoride. C. B. Chapman, et al. in "The Preparation and Properties of Grafts of Polycaprolactam on Vinyl Copolymers," Journal of Polymer Science, Vol. 34, 1959, pp. 319–335, describe the polymerization of caprolactam at elevated temperatures in the presence of a copolymer of styrene with acrylic acid or maleic anhydride. Gelling was observed in several instances.

Although polyamides have been incrementally improved as shown by the publications discussed above as examples, there remains a need for new polyamides having improved properties. For example, in contrast to the Chapman, et al. article, preferably copolymers with cyclic lactams would not gel. In particular, it is always desirable to produce engineering plastics, fibers or adhesives with new properties so that new uses may be explored.

SUMMARY OF THE INVENTION

Accordingly, it is an object of the present invention to provide a new class of polyetheramide.

It is another object of the present invention to provide novel polyether polyamides terminated with carboxyl groups which prevent gelling of the copolymer.

In carrying out these and other objects of the invention, there is provided, in one form, a carboxyl-terminated polyetheramide of the formula:

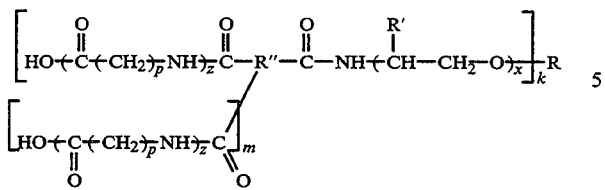

where R is a moiety from an alcohol initiator having a valence of k; R' is independently hydrogen or lower alkyl from 1 to 4 carbon atoms; R" is independently a straight or branched alkylene or aromatic moiety averaging from about 2 to 36 carbon atoms; x independently averages from about 2 to 100; z independently averages from about 20 to about 250; k averages from about 1 to 3; m is independently 0 or 1; and p is independently 5 to 11. The carboxyl-terminated polyetheramides of this invention find utility in engineering plastics, fibers and adhesives.

DETAILED DESCRIPTION OF THE INVENTION

It has been discovered that carboxyl-terminated polyetheramides with useful and unusual properties may be made by capping polyetheramides (amidoacids) with cyclic lactams. The polyetheramides are made by reacting polycarboxylic acids with polyether amines. These may be described as carboxyl-terminated polyetheramide ABC copolymers. In one embodiment, the endblocks (C) are nylon-6 and the midblocks are amidoacids based on (B) carboxylic acids including, but not limited to, dimer acid, adipic acid, trimesic acid, sebacic acid or other dibasic and tribasic acids and (A) polyetheramines based on polypropylene glycol/polyethylene glycol. JEFFAMINE ® amine products made by Texaco Chemical Company are examples of such amines.

Our invention differs from those of the art due to the fact that the products are completely carboxyl-terminated, rather than those produced from conventional amine-initiated reactions, and therefore, no gelling is observed. This is best accomplished by having a slight excess of polycarboxylic acid in the preparation of the acid-amidopolyether. The reactions schematically presented below illustrate one aspect of the reaction of this invention, using a dicarboxylic acid for illustrative purposes.

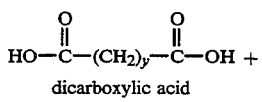
dicarboxylic acid

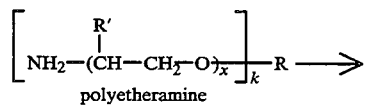
polyetheramine

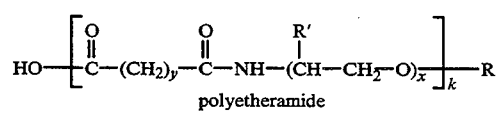
polyetheramide

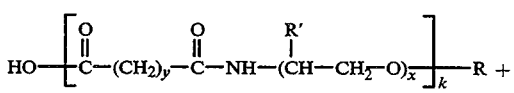

-continued

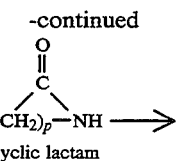
cyclic lactam

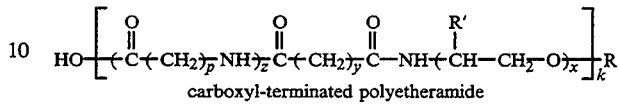
carboxyl-terminated polyetheramide where R is a moiety from an amine having a valence of k; R' is independently hydrogen or lower alkyl from 1 to 4 carbon atoms; x independently averages from about 2 to 100; y is independently 2 to 36; z independently averages from about 20 to about 250; k averages from about 1 to 3; and p is independently 5 to 11. R may be a straight or branched alkylene or alkyl moiety, a moiety from an alcohol (hydroxy) initiator to make the polyetheramine, and may average from 1 to 18 carbon atoms, preferably 1 to 12.

Carboxyl-terminated polyetheramides over a wide molecular weight range can be made, that is, amines may have just a few moles to a thousand moles of cyclic lactam attached. Thus non-gelling liquid products or high molecular weight engineering plastics may be made by this technique.

In one embodiment of this invention, the carboxyl-terminated polyetheramides have the formula as follows:

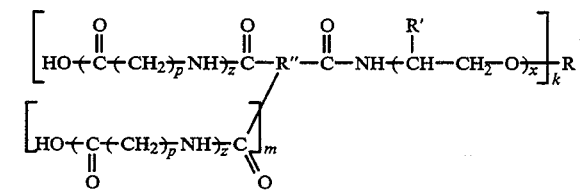

Since R' is independently hydrogen or lower alkylene of 1 to 4 carbon atoms, ethylene oxide, propylene oxide and butylene oxide moieties in random or block groups are encompassed. In another embodiment of this invention R' is hydrogen or an alkylene group of 1 to 2. The value of z independently averages about 20 to 250, more preferably averages about 100 to 200; m is 0 or 1; p is independently 5 to 11 (most preferably 5); and x independently averages 2 to 100 most preferably 30 to 60. R" is independently a straight or branched alkylene or aromatic moiety averaging from about 2 to 36 carbon atoms having a valence of 2 or 3. R is a straight or branched alkylene or alkyl moiety from a hydroxy (alcohol) compound. It is possible for k to be from 1 to 8, or preferably 1 to 5, although 1 to 3 is most preferred. In still another embodiment of the invention, k is 1 when R is from a monohydric alcohol initiator, or k is 2 when R is from a diol (glycol) initiator, or k is at least 3 when R is from a triol or higher polyol.

The cyclic lactams suitable for use in this invention include, but are not limited to caprolactam, laurolactam, etc. As noted, they may have the structure of the formula:

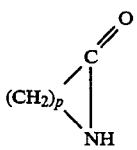

where p ranges from 5 to about 11. More than one cyclic lactam may be used, if desired. (Laurolactam and ε-caprolactam are particularly preferred.)

The polyetheramine may have the structure:

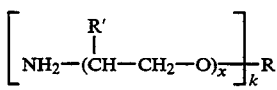

where x independently averages about 2 to about 100; k is from 1 to 8, preferably from 1 to 4 and most preferably from 1 to 3; R' is independently hydrogen or lower alkyl of 1 to 4 carbon atoms; R is a moiety from an alcohol or hydroxy compound having a valence of k, and/or an alkylene or alkyl group of from 1 to about 18 carbon atoms, preferably 1 to 12, having sufficient positions to accommodate the k polyetheramine arms. In one embodiment, x is preferably 2 to 33; and in another embodiment is from 30 to 60. The x groups may be random or block groups of ethylene oxide, propylene oxide and butylene oxide moieties, e.g. These polyetherpolyamines may be made by alkoxylating and then aminating a suitable polyol initiator. As will be described, suitable polyetheramines are the appropriate members of the JEFFAMINE ® amine products family made by Texaco Chemical Company.

The carboxylic acids used to react with the polyetheramines to form the polyetheramide intermediates of this invention have the formula:

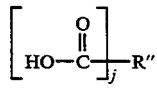

where j is from 2 to 4, preferably 2 to 3, most preferably 2. If j is greater than about 2, then an excess of the carboxylic acid will be required to help avoid crosslinking or gelling. A slight excess of the carboxylic acid may be helpful in many instances. It is anticipated that carboxylic acids where j is greater than 4 will work, although care would need to be taken to avoid crosslinking, such as by using diamines instead of higher functionality amines. In many embodiments, the mole ratio of polyether amine to carboxylic acid should be at or near 1:1, although an excess of dicarboxylic acid, such as a ratio of up to 1:1.5 is preferred. R" is an alkylene or aromatic moiety of 2 to 36 carbon atoms and having a valence matching j. If R" is an alkylene group such as —(CH$_2$)y—, y may average from about 2 to 36. R" may also be branched alkylene of a valence of j. More than one carboxylic acid may be used in the scope of this invention. Suitable carboxylic acids include, but are not limited to, adipic acid, sebacic acid, dimer acid, trimesic acid, and the like. The first step (1) to make the polyetheramide may be conducted at a temperature in the range of about 100° to about 250° C. and a pressure from about 1 to about 150 psig.

The mole ratio of cyclic lactam to polyetheramide may range from a few to very many for example from about 20:1 to about 200:1. A temperature range suitable for the reaction to prepare the carboxyl-terminated polyetheramides in step (2) is from about 220° to about 300° C., and the pressure may range from about 0 to about 600 psig. More preferably, the temperature ranges from about 240° to about 260° C., and the pressure may range from about 0 to about 400 psig. A heterogeneous or homogeneous acid catalyst may be employed. Suitable catalysts include, but are not necessarily limited to hypophosphorous acid, phosphoric acid, and phenyl phosphoric acid.

Although the process to make the materials of this invention may be practiced without any water, in some embodiments of the invention it is preferred that some water be used to aid in opening the caprolactam and increasing the speed of the reaction. The amount of water influences the product distribution as well. As little as 1% water, based on the total amounts of the reactants, may be employed. In general, the more water used, the lower the molecular weight.

The invention will be demonstrated further in the following experimental Examples, which are merely meant to illuminate the invention and not to limit it in any way. The carboxyl-terminated polyetheramides were prepared using the following procedures. They are expected to have good impact strength as well as differing water or organic solvent solubilities depending on the polyetheramine incorporated. Since they do not gel, they are easier to work with than many other materials with similar properties.

EXAMPLES 1–4

Preparation of Carboxyl-Terminated Polyamides
(Cyclic Lactams and Amido Acids)

A 300-ml stainless steel autoclave was equipped with a mechanical stirrer, magnetic drive, electrical heater and nitrogen purge. The reactor was charged with laurolactam and various carboxylic acids/amido acids (as specified in Table I), 50 ml of deionized water and 0.25 grams of IRGANOX 1098. The reactants and water were charged then purged with nitrogen for 15 minutes followed by heating at 250° C. for 2 hours to allow ring opening of the lactam with water. Water was slowly vented off and reactants were held at 250° C. for one additional hour. An alternative method involved heating for 3.5 hours followed by extrusion with no venting of the water until after the reaction. Extruded products varied in color depending on that of the starting material. Extractions (in water or methanol) were performed on all products to remove unreacted starting material(s). Nylon modifier content ranged up to 25%, more preferably from 10 to 20%. The polyetheramides, formed by the reaction of a polyetheramine and a carboxylic acid, are the nylon modifiers of this invention.

Examples 5–7 were prepared in a similar manner using caprolactam and various amido acids (as specified in Table II), 1.0 grams of IRGANOX 1098 and up to 175 ml of deionized water.

TABLE I

| | Nylon 12 Modified with Amidoacid/Carboxylic Acid | |
|---|---|---|
| Ex. | Laurolactam, g. Modifier | Product appearance |
| 1 | 75  T-3000/Dimer acid, 25 g. | White |
| 2 | 85  T-3000/Dimer acid, 15 g. | White |
| 3 | 85  T-3000/Adipic acid, 15 g. | White |

TABLE I-continued

Nylon 12 Modified with Amidoacid/Carboxylic Acid

| Ex. | Laurolactam, g. | Modifier | Product appearance |
|---|---|---|---|
| 4 | 85 | M-2070/Adipic acid, 15 g. | White |

TABLE II

Nylon 6 Modified with Amidoacid/Carboxylic Acid

| Ex. | Caprolactam, g. | Modifier | Product appearance |
|---|---|---|---|
| 5 | 280 | ED-2001/Adipic acid, 70 g. | Beige |
| 6 | 340 | T-3000/Adipic acid, 60 g. | Off-white |
| 7 | 340 | M-2070/Adipic acid, 60 g. | Off-white |

EXAMPLES 8–9

Preparation of Trifunctional Amido Acids

Example 8

To a 3-liter, 3-necked flask equipped with a thermometer, stirrer, a dropping funnel with a Dean-Stark trap and nitrogen pad were charged 2100 g. JEFFAMINE® T-3000 amine (0.7 moles) and 291 grams (2.0 moles) adipic acid. The mixture was heated at 220° C. for 3 hours. Water was removed throughout the reaction. The resultant product was a gold, semi-viscous liquid with an acid number of 0.86 meq/g. (calculated value was 0.85 meq/g.) and an amine assay of 0.01 meq/g.

Example 9

To a 3-liter, 3-necked flask equipped with a thermometer, stirrer, a dropping funnel with a Dean-Stark trap and nitrogen pad, were charged 189 g. trimesic acid (0.9 moles) and 700 ml t-butanol. The mixture was heated to reflux and over a two hour period, 900 g. of JEFFAMINE T-3000 amine (0.3 moles) was slowly added. It was held at reflux for 2 hrs. and all the t-butanol was removed. The material was heated to 220° C. and held an additional 2 hours at this temperature, then it was heated under 1 mm Hg vacuum for 1 hr. This product began to increase in viscosity (indicating it was beginning to crosslink) and an approximate 7 g. portion was poured into a test tube and heated to 225° C. for 2.5 hrs. The material crosslinked into a sticky gummy polymer. This indicated than an excess of the carboxylic acid was necessary to obtain a desired product which did not crosslink. Trimesic acid has the structure:

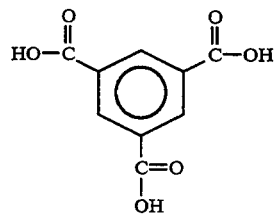

In one embodiment of the invention, in the preparation of amido acids it is preferred that aliphatic dibasic acids be used in conjunction with triamines to help minimize the potential for crosslinking. As noted it is also desirable to use an excess of the di- or tribasic acid. In some situations a slight excess, up to about 5%, may be necessary, and with some reactants a large excess, up to about 50%, may be preferred. Aromatic dibasic acids, such as trimesic acid, react more slowly with amines than aliphatic dibasic acids and this can lead to crosslinking problems in the preparation of the amido acids.

Many modifications may be made in the process of this invention without departing from the spirit and scope thereof which are defined only in the appended claims. For example, one skilled in the art may discover that a certain combination or proportion of cyclic lactam and polyetheramides may give advantageous properties.

GLOSSARY

| | |
|---|---|
| IRGANOX | Complex, high molecular weight stabilizer sold by Ciba-Geigy Corporation used as an anti-oxidant. |
| JEFFAMINE® ED-2001 amine | Polyalkylene glycol diamine having the formula: Formula ED $$O\left[(CH_2CH_2O)_A-(CH_2-\underset{\underset{CH_3}{|}}{CH}-O)_B-CH_2-\underset{\underset{CH_3}{|}}{CH}-NH_2\right]_2$$ where A = 21 and B = 0.75. |
| JEFFAMINE® M-2070 amine | $$CH_2OCH_2CH_2O(CH_2\underset{\underset{R}{|}}{C}HO)_{40}CH_2\underset{\underset{CH_3}{|}}{C}HNH_2$$ R = 70% H; 30% $CH_3$ |
| JEFFAMINE® T-3000 amine | Partially aminated polyol having 1.0 meq/g total acetylatables, a total amine content of 0.99 meq/g and a primary amine content of 0.093 meq/g having the formula: $$CH_2-(O-CH_2\underset{\underset{CH_3}{|}}{C}H)_x-NH_2$$ $$\underset{|}{C}H-(O-CH_2\underset{\underset{CH_3}{|}}{C}H)_y-NH_2$$ $$CH_2-(O-CH_2\underset{\underset{CH_3}{|}}{C}H)_z-NH_2$$ where x + y + z = 46.4. |

We claim:

1. A non-gelled, carboxyl-terminated polyetheramide of the formula:

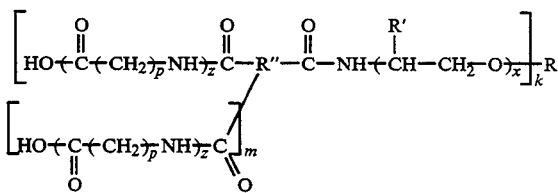

where
- R is a moiety from an alcohol initiator having a valence of k;
- R' is independently hydrogen or lower alkyl from 1 to 4 carbon atoms;
- R" is independently a straight or branched alkylene or aromatic moiety averaging from about 2 to 36 carbon atoms;
- x independently averages from about 2 to 100;
- z independently averages from about 20 to about 250;
- k averages from about 1 to 8;
- m is independently 0 or 1; and
- p is independently 5 to 11; made by a process comprising the steps of:
  (1) reacting a carboxylic acid with a polyetheramine to form a polyetheramide, where the carboxylic acid has the formula:

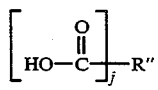

where averages from 2 to 3 and R" is as defined above with a valence of j; where the polyether amine has the formula:

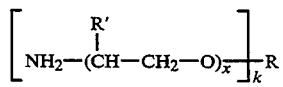

where R, R', x and k are defined as above; and where the resulting polyetheramide has the formula:

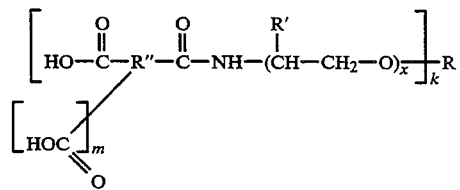

where R, R', R", x, k and m are defined as above; and
  (2) reacting the polyetheramide with a cyclic lactam having the formula:

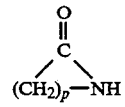

where p is defined as above, to give the liquid, non-gelled, carboxyl-terminated polyetheramide.

2. A non-gelled, carboxyl-terminated polyetheramide of the formula:

where
- R is a moiety from an alcohol initiator having a valence of k;
- R' is independently hydrogen or lower alkyl from 1 to 4 carbon atoms;
- x independently averages from about 2 to 100;
- y is independently 2 to 36;
- z independently averages from about 20 to about 250;
- k averages from about 1 to 8; and
- p is independently 5 to 11; made by a process comprising the steps of:
  (1) reacting a carboxylic acid with a polyetheramine to form a polyetheramide, where the carboxylic acid has the formula:

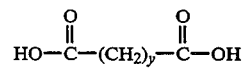

where y is independently 2 to 36; where the polyether amine has the formula:

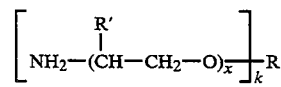

where R, R', x and k are defined as above; and where the resulting polyetheramide has the formula:

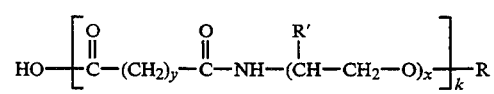

where R, R', x, y and k are defined as above; and
  (2) reacting the polyetheramide with a cyclic lactam having the formula:

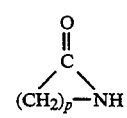

where p is defined as above, to give the liquid, non-gelled, carboxyl-terminated polyetheramide.

3. A non-gelled, carboxyl-terminated polyetheramide of the formula:

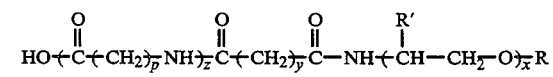

where
- R is a straight or branched alkyl moiety from a monohydric alcohol initiator;
- R' is independently hydrogen or lower alkyl from 1 to 2 carbon atoms;
- x independently averages from about 2 to 33;

y is independently 2 to 36;

z independently averages from about 20 to about 250; and p is independently 5 to 11; made by a process comprising the steps of:

(1) reacting a carboxylic acid with a polyetheramine to form a polyetheramide, where the carboxylic acid has the formula:

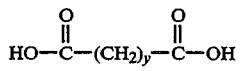

where y is independently 2 to 36; where the polyether amine has the formula:

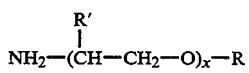

where R, R' and x are defined as above; and where the resulting polyetheramide has the formula:

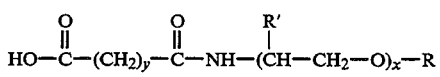

where R, R', x and y are defined as above; and (2) reacting the polyetheramide with a cyclic lactam having the formula:

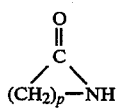

where p is defined as above, to give the liquid, non-gelled, carboxyl-terminated polyetheramide.

4. A non-gelled, carboxyl-terminated polyetheramide of the formula:

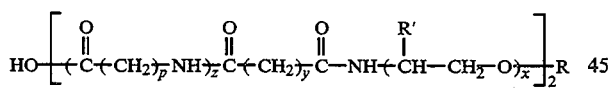

where

R is a straight or branched alkylene moiety from a glycol initiator;

R' is independently hydrogen or lower alkyl from 1 to 2 carbon atoms;

x independently averages from about 2 to 33;

y is independently 2 to 36;

z independently averages from about 20 to about 250; and p is independently 5 to 11; made by a process comprising the steps of:

(1) reacting a carboxylic acid with a polyetheramine to form a polyetheramide, where the carboxylic acid has the formula:

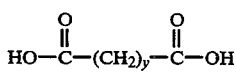

where y is independently 2 to 36; where the polyether amine has the formula:

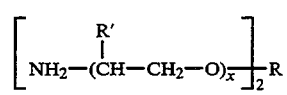

where R, R' and x are defined as above; and where the resulting polyetheramide has the formula:

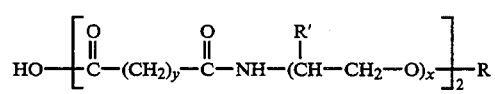

where R, R', x and y are defined as above; and (2) reacting the polyetheramide with a cyclic lactam having the formula:

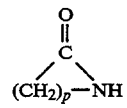

where p is defined as above, to give the liquid, non-gelled, carboxyl-terminated polyetheramide.

5. A non-gelled, carboxyl-terminated polyetheramide of the formula:

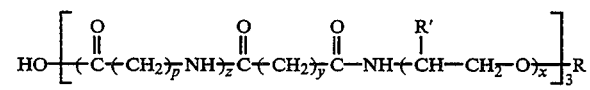

where

R is a straight or branched alkylene moiety from a trihydric alcohol;

R' is independently hydrogen or lower alkyl from 1 to 2 carbon atoms;

x averages from about 2 to 33;

y is independently 2 to 36;

z averages from about 20 to about 250; and p is independently 5 to 11; made by a process comprising the steps of:

(1) reacting a carboxylic acid with a polyetheramine to form a polyetheramide, where the carboxylic acid has the formula:

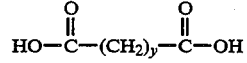

where y is independently 2 to 36; where the polyether amine has the formula:

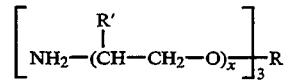

where R, R' and x are defined as above; and where the resulting polyetheramide has the formula:

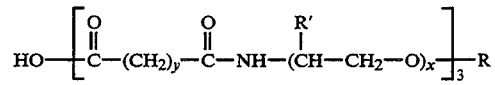

where R, R', x and y are defined as above; and (2) reacting the polyetheramide with a cyclic lactam having the formula:

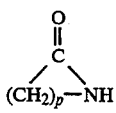

where p is defined as above, to give the liquid, non-gelled, carboxyl-terminated polyetheramide.

6. A method for making a non-gelled, carboxyl-terminated polyetheramide of the formula:

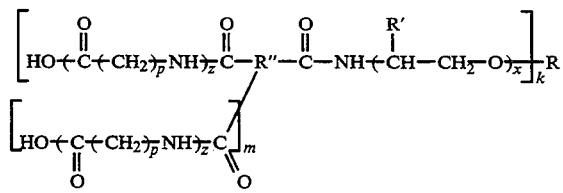

where
R is a moiety from an alcohol initiator having a valence of k;
R' is independently hydrogen or lower alkyl from 1 to 4 carbon atoms;
R" is independently a straight or branched alkylene or aromatic moiety averaging from about 2 to 36 carbon atoms;
x independently averages from about 2 to 100;
z independently averages from about 20 to about 250;
k averages from about 1 to 8;
m is independently 0 or 1; and
p is independently 5 to 11; comprising the steps of:
(1) reacting a carboxylic acid with a polyetheramine to form a polyetheramide, where the carboxylic acid has the formula:

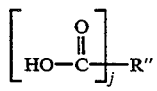

where j averages from 2 to 3 and R" is as defined above with a valence of j; where the polyether amine has the formula:

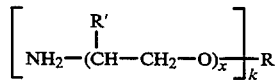

where R, R', x and k are defined as above; and where the resulting polyetheramide has the formula:

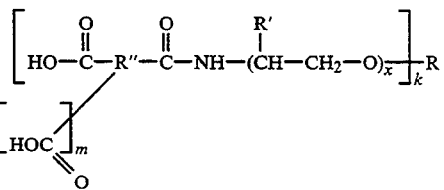

where R, R', R", x, k and m are defined as above; and
(2) reacting the polyetheramide with a cyclic lactam having the formula:

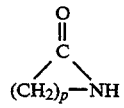

where p is defined as above, to give the liquid, non-gelled carboxyl-terminated polyetheramide.

7. The method of claim 6 where there is a mole ratio of carboxylic acid to amine functionality on the polyether amine and the carboxylic acid is in molar excess to the amine functionality so that all amine groups on the polyether amine are reacted with carboxylic acid.

8. The non-gelled, carboxyl-terminated polyether amide of claim 1 where R is a moiety from a monohydric alcohol initiator and k averages about 1.

9. The non-gelled, carboxyl-terminated polyether amide of claim 1 where R is a moiety from a glycol initiator and k averages about 2.

10. The non-gelled, carboxyl-terminated polyether amide of claim 1 where R is a moiety from a trihydric initiator and k averages from about 3 to 8.

11. The non-gelled, carboxyl-terminated polyether amide of claim 2 where R is a moiety from a monohydric alcohol initiator and k averages about 1.

12. The non-gelled, carboxyl-terminated polyether amide of claim 2 where R is a moiety from a glycol initiator and k averages about 2.

13. The non-gelled, carboxyl-terminated polyether amide of claim 2 where R is a moiety from a trihydric alcohol initiator and k averages from about 3 to 8.

14. The method of claim 6 where step (1) comprises reacting at a temperature of about 100° to about 250° C. and step (2) comprises reacting at a temperature of about 220° to about 300° C.

15. The method of claim 6 where the mole ratio of carboxylic acid to polyether amine ranges from about 1:1 to about 1.5:1.

* * * * *